United States Patent
Duesterhoeft et al.

(10) Patent No.: US 9,764,716 B2
(45) Date of Patent: Sep. 19, 2017

(54) WIPER ARM ARRANGEMENT AND METHOD FOR CONNECTING A WIPER BLADE TO A WIPER ARM

(75) Inventors: Richard Duesterhoeft, Holzgerlingen (DE); Holger Fitterer, Rheinstetten (DE); Uwe Renz, Walddorfhaeslach (DE); Heiko Schmid, Oberriexingen (DE); Andreas Zygan, Malsch (DE); Xavier Bousset, Mezel (FR); Giuseppe Grasso, Le Breuil sur Couze (FR); Vincent Izabel, Chilly-Mazarin (FR); Gèrald Caillot, Cernay la Ville (FR)

(73) Assignees: Daimler AG, Stuttgart (DE); Valeo Systemes D'Essuyage, Le Mesnil Saint Denis (FR)

( * ) Notice: Subject to any disclaimer, the term of this patent is extended or adjusted under 35 U.S.C. 154(b) by 279 days.

(21) Appl. No.: 13/885,416

(22) PCT Filed: Oct. 19, 2011

(86) PCT No.: PCT/EP2011/005255
§ 371 (c)(1),
(2), (4) Date: Jun. 26, 2013

(87) PCT Pub. No.: WO2012/065669
PCT Pub. Date: May 24, 2012

(65) Prior Publication Data
US 2013/0263400 A1   Oct. 10, 2013

(30) Foreign Application Priority Data
Nov. 16, 2010  (DE) ........................ 10 2010 052 308

(51) Int. Cl.
*B60S 1/38* (2006.01)
*B60S 1/40* (2006.01)
*B60S 1/52* (2006.01)

(52) U.S. Cl.
CPC ............... *B60S 1/40* (2013.01); *B60S 1/3862* (2013.01); *B60S 1/4048* (2013.01); *B60S 1/524* (2013.01);
(Continued)

(58) Field of Classification Search
CPC ............ B60S 1/4048; B60S 2001/4054; B60S 1/3862; B60S 1/524; B60S 1/4045;
(Continued)

(56) References Cited

U.S. PATENT DOCUMENTS

| 8,381,348 B2* | 2/2013 | Egner-Walter et al. ... 15/250.04 |
| 2011/0113580 A1* | 5/2011 | Caillot et al. .............. 15/250.01 |
| 2011/0185531 A1 | 8/2011 | Egner-Walter et al. |

FOREIGN PATENT DOCUMENTS

| DE | 10 2008 021 457 A1 | 11/2009 |
| DE | 10 2008 049 269 A1 | 4/2010 |

(Continued)

OTHER PUBLICATIONS

DE102008049269A1 (machine translation), 2010.*
(Continued)

*Primary Examiner* — Andrew A Horton
(74) *Attorney, Agent, or Firm* — Crowell & Moring LLP

(57) ABSTRACT

A wiper arm arrangement with a wiper arm of a windscreen wiper system of a vehicle and an attachment element having at least one line. The attachment element can be coupled to a connecting element designed for holding a wiper blade and for connecting the wiper blade to the wiper arm. Due to the coupling, at least one corresponding line of the connecting element can be joined onto the at least one line of the attachment element. The connecting element can be fitted onto the attachment element in an installation direction which coincides at least substantially with a direction of longitudinal extent of the wiper arm. The attachment ele-
(Continued)

ment is arranged on the wiper arm so as to be movable in the direction of longitudinal extent of the wiper arm.

9 Claims, 4 Drawing Sheets

(52) U.S. Cl.
CPC ...... *B60S 1/3805* (2013.01); *B60S 2001/4054* (2013.01)

(58) Field of Classification Search
CPC ............ B60S 1/4038; B60S 2001/4051; B60S 2001/4058; B60S 1/4064; B60S 2001/4061; B60S 1/3805
USPC ............. 15/250.01–250.07, 250.32, 250.361
See application file for complete search history.

(56) References Cited

FOREIGN PATENT DOCUMENTS

| | | |
|---|---|---|
| DE | 10 2008 049 270 A1 | 4/2010 |
| EP | 2 228 271 A1 | 9/2010 |
| FR | 2933932 A1 * | 1/2010 ................ B60S 1/48 |

OTHER PUBLICATIONS

International Search Report with English translation dated Jan. 23, 2012 (four (4) pages).
German Office Action with partial English translation dated Apr. 14, 2011 (nine (9) pages).

\* cited by examiner

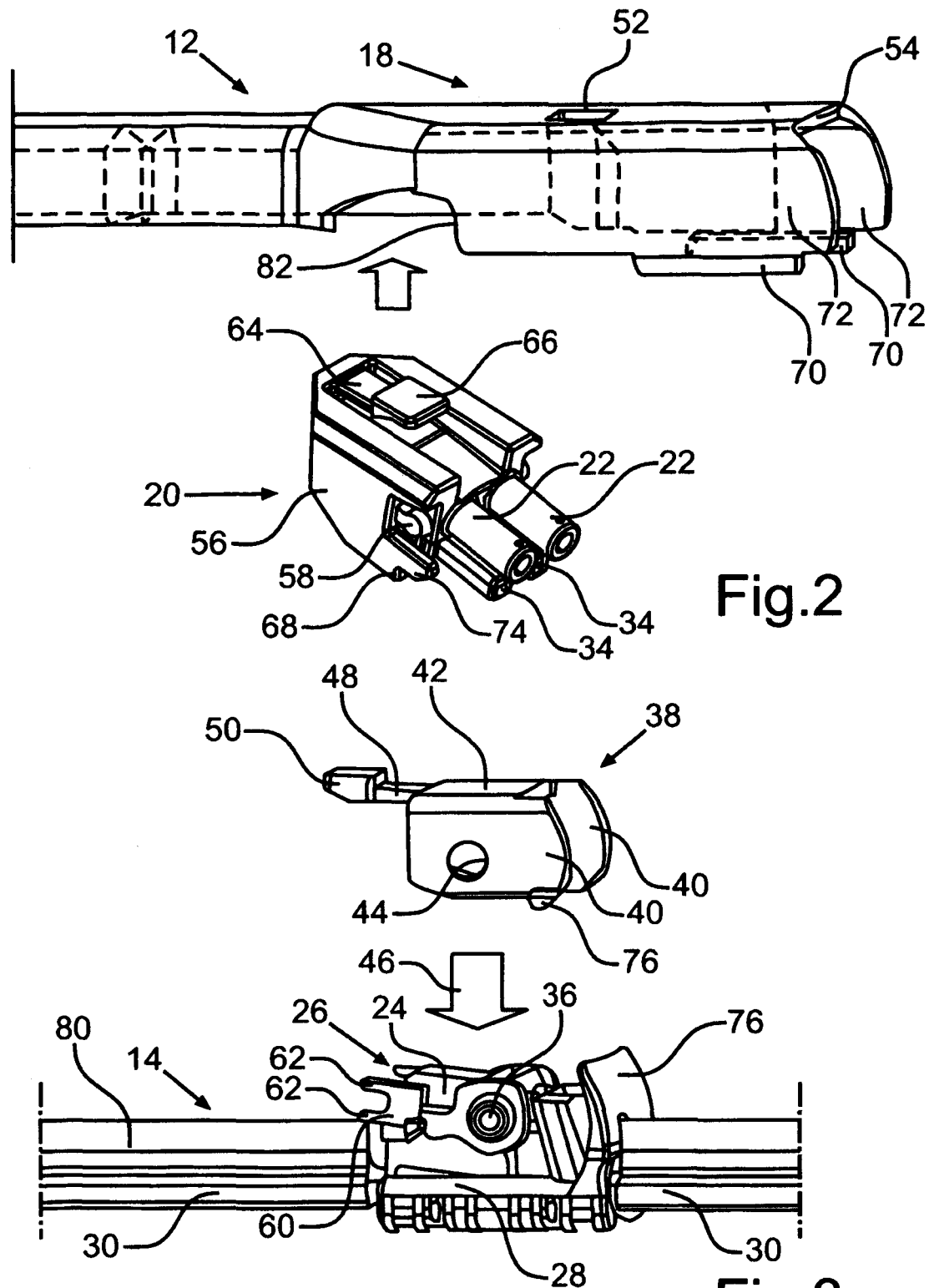

WIPER ARM ARRANGEMENT AND METHOD FOR CONNECTING A WIPER BLADE TO A WIPER ARM

BACKGROUND AND SUMMARY OF THE INVENTION

Exemplary embodiments of the present invention relate to a wiper arm arrangement with a wiper arm of a windscreen wiper system of a vehicle and with an attachment element having at least one line. The attachment element can be coupled to a connecting element designed for holding a wiper blade and for connecting the wiper blade to the wiper arm. By coupling the attachment element to the connecting element, at least one corresponding line of the connecting element can be joined onto the at least one line of the attachment element. The connecting element can be fitted onto the attachment element in an installation direction coinciding at least substantially with a direction of longitudinal extent of the wiper arm. Furthermore, exemplary embodiments of the present invention relate to a method for connecting a wiper blade to a wiper arm of a windscreen wiper system of a vehicle.

German patent document DE 10 2008 049 269 A1 describes a connection of a wiper blade to a wiper arm via an adaptor coupled to two channels made in the wiper blade for washer fluid. The washer fluid coming from the wiper arm is led via the adaptor into the wiper blade. The adaptor is fitted onto the wiper arm together with the wiper blade in the direction of longitudinal extent of the wiper arm and is therefore joined to a joining plug that is fixed in the wiper arm. An upper part of the adaptor is connected in articulated fashion to a lower part of the adaptor via a pivot bolt that is passed through the lower part of the adaptor. Two pieces of hose, which take the washer fluid out of the lines running in the direction of longitudinal extent of the wiper arm in the upper part of the adaptor, are arranged on a front side of the upper part of the adaptor. Via the two flexible pieces of hose having a loop, the washer fluid is passed to the two channels running in the direction of longitudinal extent of the wiper blade.

German patent document DE 10 2008 021 457 A1 describes a wiper blade that can be fixed on a wiper arm of a windscreen wiper system by means of a two-part adaptor. Two joining lines are fixed to the wiper arm, which joining lines are connected to two channels arranged on an upper part of the adaptor if the adaptor together with the wiper blade is inserted from the front, in other words in the direction of longitudinal extent of the wiper arm, into an end region of the wiper arm. The upper part of the adaptor is supported in articulated fashion on a pivot bolt passing through a lower part of the adaptor. On the lower part of the adaptor are likewise formed two channels for washer fluid via which lines running along the wiper blade can be charged with washer fluid.

It is to be considered disadvantageous here that it is comparatively difficult for a mechanic to connect the wiper blade to the wiper arm via the adaptor.

Exemplary embodiments of the present invention are directed to a wiper arm arrangement and a method of the kind specified at the beginning which makes it easier to connect the wiper blade to the wiper arm.

The wiper arm arrangement according to the invention comprises a wiper arm of a windscreen wiper system of a vehicle and an attachment element having at least one line. The attachment element can be coupled to a connecting element designed for holding a wiper blade and for connecting the wiper blade to the wiper arm. By means of the coupling, at least one corresponding line of the connecting element can be joined onto the at least one line of the connecting element. The connecting element can be fitted onto the attachment element in an installation direction that is at least substantially the same as a direction of longitudinal extent of the wiper arm. The attachment element is arranged here on the wiper arm so as to be movable in the direction of longitudinal extent of the wiper arm. The attachment element can therefore be moved particularly near to one end of the wiper arm from which the connecting element can be inserted into the wiper arm. Here, that is to say near the end of the wiper arm, the attachment element is then particularly easily accessible, as a result of which the connecting element can be coupled particularly easily to the attachment element.

When the wiper blade is being removed from the wiper arm, the connecting element can likewise be separated particularly easily from the attachment element if the attachment element is nearer to the end of the wiper arm than is the case in an operational position or functional position of the attachment element. In the functional position, the lines of the attachment element and of the connecting element are coupled to one another and the wiper arm can guide the connecting element, which is holding the wiper blade, securely over the windscreen to be wiped.

In an advantageous embodiment of the invention, when coupled to the connecting element, the attachment element can be moved in the direction of longitudinal extent of the wiper arm through movement of the connecting element. This is because the connecting element is easily accessible and is therefore particularly easily to handle by a mechanic. It is therefore favorable if the mechanic, by pulling the connecting element or by pushing the connecting element, can displace the attachment element along the wiper arm in the direction of longitudinal extent thereof.

It is also advantageous if an end region of the wiper arm has at least one latch opening in which, in a functional position of the connecting element, a corresponding latch element of the connecting element can be received. Such latching of the latch element in the latch opening secures the connecting element in its position in relation to the direction of longitudinal extent of the wiper arm. By bringing the latch element into engagement in the latch opening, the functional position of the connecting element is clearly definable. The latching of the latch element in the latch opening can also be clearly heard and felt, that is to say haptically detected, by the mechanic. In particular, if the latch opening is arranged in a back of the wiper arm, the latching of the latch element in the latch opening can also be visually identified particularly easily by the mechanic.

It has proven advantageous here if at least one latch element arranged on the attachment element can be brought into the at least one latch opening arranged in the end region of the wiper arm by bringing the attachment element into an installation position. The mechanic can then easily tell whether the attachment element is in the installation position in which the connecting element can be fitted onto the attachment element or the connecting element can be removed from the attachment element. In the installation position, the attachment element is also secured in position by the latching of the latch element into the latch opening (which can be heard and felt).

In a further advantageous embodiment of the invention, when the attachment element is brought into the installation position, the attachment element is taken to a guide on the wiper arm before the at least one latch element of the attachment element engages in the corresponding latch opening arranged in the end region of the wiper arm. The guide ensures that the attachment element can be moved particularly easily in the direction of longitudinal extent. The guide also prevents the attachment element from being able to move out of the end region of the wiper arm in an undesired direction, in particular downwards.

It has proven to be even more advantageous here if, when the attachment element is fixed on the wiper arm in the installation position, the connecting element can be detached from the attachment element by further movement of the connecting element in the direction of longitudinal extent of the wiper arm. This makes it possible to ensure that the connecting element can only separate from the attachment element if the attachment element has reached its installation position and is fixed in this installation position. When attachment element and connecting element are separated, corresponding latch elements can be disengaged from one another because this can be heard and felt particularly easily by the mechanic.

In order to predetermine the installation position particularly reliably, the wiper arm arrangement can comprise at least one stop which limits the movement of the attachment element in the direction of longitudinal extent of the wiper arm when the attachment element is brought into the installation position.

The at least one line is preferably designed to carry washer fluid and/or heat into the connecting element. The washer fluid and/or heat can then be carried further into the wiper blade via the connecting element. If washer fluid can be carried into the connecting element via the at least one line, it is possible to apply washer fluid to the windscreen to be wiped via the connecting element or via the wiper blade. This makes it possible to use the washer fluid particularly sparingly, in other words to provide for a particularly small dosage of washer fluid to clean the windscreen. In addition, if the washer fluid is discharged from the connecting element or directly from the wiper blade no jet of washer fluid is applied to the windscreen a long time before it is wiped, which would obstruct the vehicle user's view through the windscreen.

If the line is designed to carry heat into the connecting element and from the latter on into the wiper blade, heating the wiper blade can prevent the wiper blade from freezing to the windscreen in winter. It is therefore also possible to ensure particularly quiet wiping of the windscreen because a blade rubber arranged on the wiper blade can be kept, through heating, within a temperature range in which it can flex comparatively easily and the blade rubber moves particularly quietly during wiping of the windscreen.

If the line is designed to carry both washer fluid and heat into the wiper blade, the region of the wiper blade carrying the washer fluid can also be prevented from freezing up through heating. The warm washer fluid can also be used to de-ice the windscreen.

In a further advantageous embodiment of the invention, the wiper arm arrangement comprises the connecting element. The connecting element has at least one latch element comprising a recess open in the installation direction, in which a journal arranged on the attachment element is received in a latched manner when coupled with the attachment element. The mechanic can therefore hear whether coupling with the attachment element has taken place, and likewise whether the connecting element has been unlatched if the latch element releases the journal arranged on the attachment element.

It is also particularly easy to adjust, through the layout of the recess open in the installation direction, the force with which the connecting element has to be pulled in order to separate the latter from the attachment element or the force that has to be used to couple the connecting element to the attachment element by pushing the connecting element in the installation direction. As a latch element, provision may be made in particular for what is referred to as an omega clip, the two arms of which at least engage under the journal when the connecting element is coupled with the attachment element or further enclose it, in particular completely.

In a further advantageous embodiment of the invention in which the wiper arm arrangement has the connecting element, the connecting element comprises an upper part arranged on the wiper arm, on which a lower part of the connecting element designed for holding the wiper blade is supported such that it can rotate about a rotational axle. This allows a relative movement of the lower part with respect to the upper part arranged on the wiper arm. As a result, the wiper blade can match the course of the usually curved windscreen surface if the wiper arm moves the wiper blade over the windscreen of the vehicle.

Inserting the connecting element into the end region of the wiper arm can be made easier by an insertion element, for example an insertion chamfer, which can be formed on the lower part of the connecting element. This makes it easier to fit the connecting element onto the wiper arm and remove the connecting element or the wiper blade coupled to the connecting element.

Finally, it has proven advantageous if at least one stop of the upper part is in abutment with the wiper arm when the connecting element is in the functional position. This enables the mechanic to tell particularly reliably whether the functional position has been reached. Additionally or alternatively, at least one lower side of the upper part can rest on a guide provided on the wiper arm when the connecting element is in the functional position. In this way, the connecting element, when in the functional position, is prevented from working loose downwards from the wiper arm.

In the method according to the invention for connecting a wiper blade to a wiper arm of a windscreen wiper system of a vehicle, an attachment element having at least one line is coupled to a connecting element designed for holding the wiper blade and for connecting the wiper blade to the wiper arm. By coupling the attachment element to the connecting element, at least one corresponding line of the connecting element is joined onto the at least one line of the attachment element. The connecting element is fitted onto the attachment element in an installation direction coinciding at least substantially with a direction of longitudinal extent of the wiper arm. The attachment element coupled to the connecting element is moved in the direction of longitudinal extent of the wiper arm. A similar movement of the attachment element along the wiper arm also takes place when the wiper blade is removed from the wiper arm, wherein the attachment element coupled to the connecting element is moved in the opposite direction, that is to say towards the end of the wiper arm. This method allows the wiper blade to be connected more easily to the wiper arm and the wiper blade to be removed more easily from the wiper arm.

The advantages and preferred embodiments described in respect of the wiper arm arrangement according to the invention also apply to the method according to the invention and vice versa.

The features and combinations of features specified in the description above and the features and combinations of features specified in the description of the figures and/or in the figures only below can be used not only in the combination specified in each case, but also in other combinations or on their own without falling outside the scope of the invention.

BRIEF DESCRIPTION OF THE DRAWING FIGURES

Further advantages, features and details of the invention can be seen in the claims, the following description of preferred exemplary embodiments and by reference to the following drawings:

FIG. 2 illustrates a perspective view of the wiper arm with its end region having a U-profile in cross section and the combination plug;

FIG. 3 illustrates a perspective view of a slider forming an upper part of the adaptor and a rider which forms a lower part of the adaptor and which holds the wiper blade;

DETAILED DESCRIPTION

Figure 1:
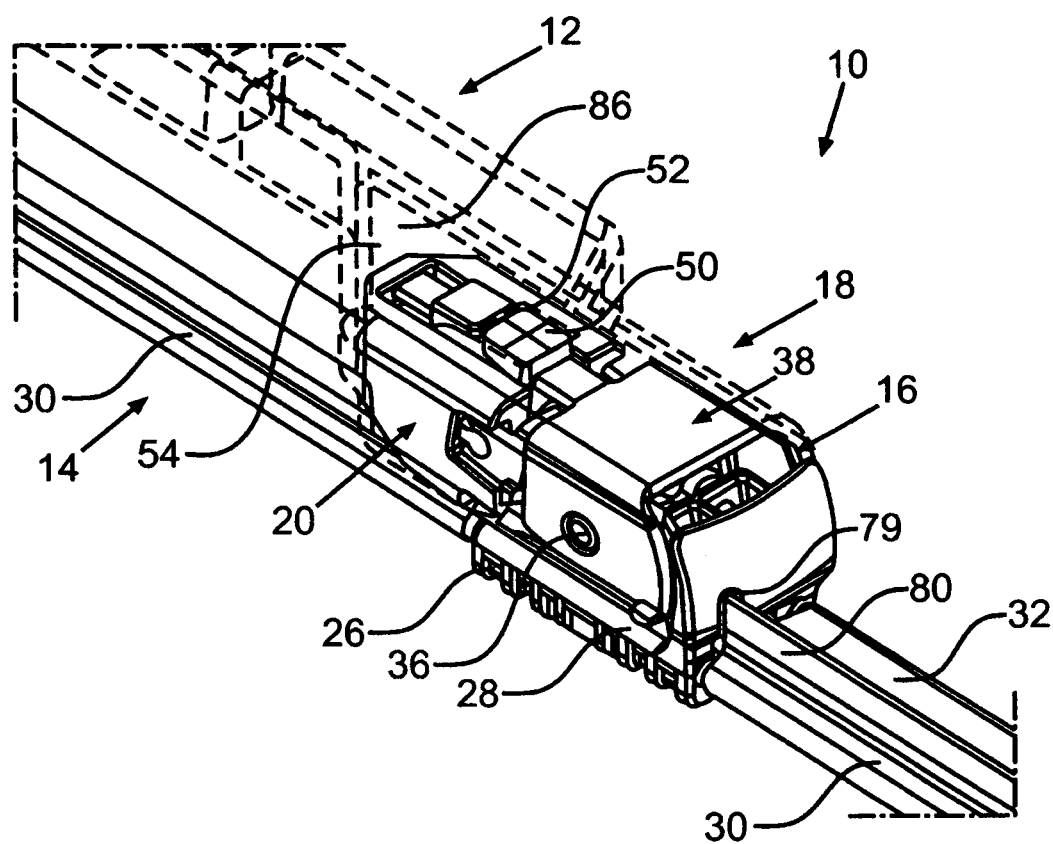
FIG. 1 illustrates a water-carrying and heatable wiper blade held so as to be movable on a wiper arm of a windscreen wiper system of a vehicle by means of an adaptor, wherein the adaptor is coupled to a combination plug which is received in an end region of the wiper arm.

FIG. 1 shows a connecting arrangement 10 of a windscreen wiper system of a vehicle, wherein a wiper arm 12 of the connecting arrangement 10 is coupled to a water-carrying and heatable wiper blade 14. The wiper blade 14 is held so as to be movable by means of an adaptor 16 on an end region 18 of the wiper arm 12. The adaptor 16 (cf. FIG. 7), in its functional position shown in FIG. 1, is coupled to a combination plug 20 arranged in the end region 18 of the wiper arm 12.

The combination plug 20 (cf. FIG. 2) has two channel pieces 22 extending in the direction of longitudinal extent of the wiper arm 12, which channel pieces 22 are connected, when the adaptor 16 is coupled to the combination plug 20, to two corresponding lines 24 formed in a rider 26 of the adaptor 16 forming a lower part (cf. FIG. 3). Each of the two lines 24 of the rider 26 opens into a connecting line 28 integrally formed with the rider 26 and which runs in the direction of longitudinal extent of the wiper blade 14.

The two connecting lines 28 are respectively fluidically coupled to two channels 30 formed in a spoiler 32 of the wiper blade 14. Washer fluid can be brought into the channels 30 of the wiper blade 14 via the channel pieces 22 of the combination plug 20. When the windscreen of the vehicle is being wiped with the wiper blade 14, the washer fluid can be discharged from the channels 30 onto the windscreen via outlets (not shown), in particular via nozzles.

The combination plug 20 also comprises two electrical connections 34 extending in the same direction as the channel pieces 22, which electrical connections 34 are connected to corresponding electrical lines (not shown). The electrical lines run via the rider 26 into the wiper blade 14 and allow the wiper blade and/or the washer fluid to be heated. By heating the wiper blade 14, it can be prevented from freezing up in winter. The noise made by the movement of a blade rubber (not shown) of the wiper blade 14 can also be kept down if the blade rubber is kept within a favourable temperature range. By heating the wiper blade 14, the water-carrying channels 30 in the wiper blade 14 can also be prevented from freezing up, and the warm washer fluid can be used to de-ice the windscreen of the vehicle.

A slider 38 (cf. FIG. 3) forms an upper part of the adaptor 16. The rider 26 of the adaptor 16 is movable about a rotational axle 36 with respect to the slider 38 arranged in the functional position or working position of the adaptor 16 shown in FIG. 1 in the end region 18 of the wiper arm 12. Because the rider 26 holding the wiper blade 14 can be tilted with respect to the slider 38, the wiper blade can match the course of the usually curved windscreen surface if the wiper arm 12 moves the wiper blade 14 over the windscreen in wiping operation.

The slider 38 has a U-profile in cross section and comprises two side walls 40 connected to one another via a back 42 (cf. FIG. 3). In the side walls 40 is arranged a through-opening 44 through which the rotational axle 36 of the slider 38 passes when the slider 38 is connected to the rider 26. FIG. 3 shows, by means of an arrow 46 indicating the installation direction, how the slider 38 is fitted onto the rider 26 from above.

From the back 42 of the slider 38, a latching tongue 48 extends backwards in the direction of longitudinal extent of the wiper blade 14, which latching tongue 48 comprises a latching pin 50. In the functional position of the adaptor 16 shown in FIG. 1, the latching pin 50 passes through a latch opening 52 which is formed in a back 54 of the wiper arm 12 which likewise has a U-profile in its end region 18.

Figure 6:
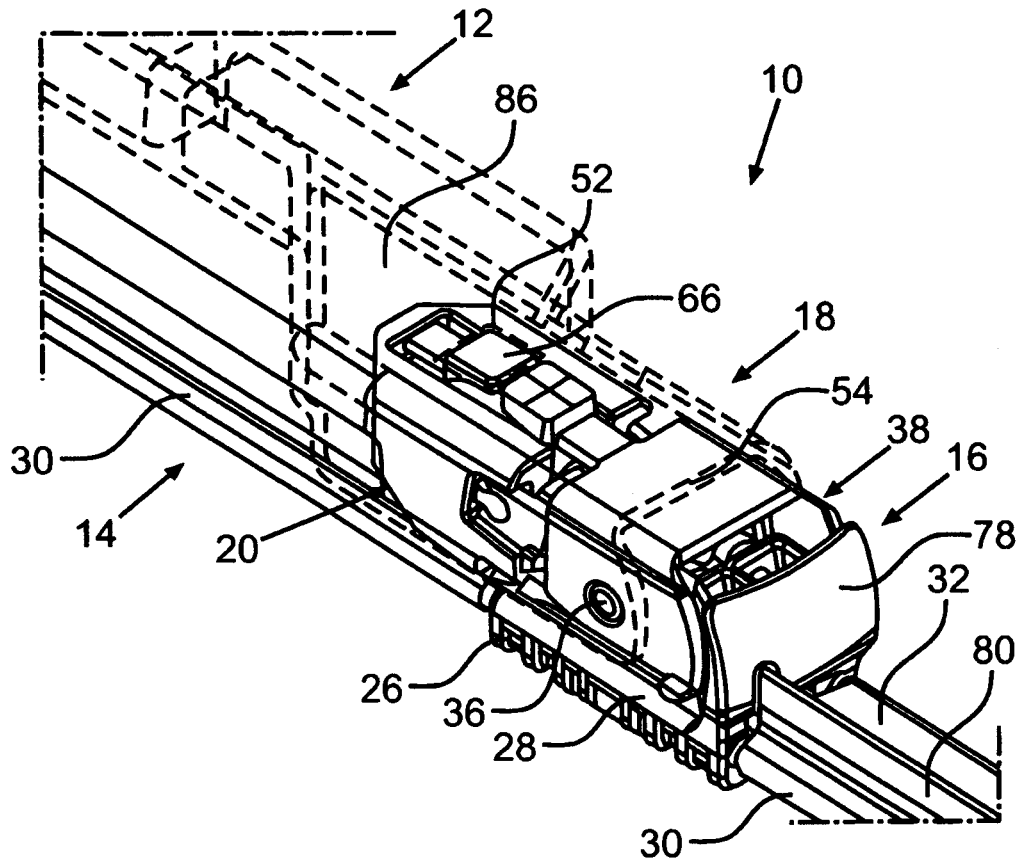
FIG. 6 illustrates the connecting arrangement according to FIG. 4 with a combination plug displaced to a front end of the wiper arm in an installation position.

In order to detach the wiper blade 14 from the wiper arm 12, a mechanic presses the latching pin 50 downwards and the adaptor 16 can be pulled forwards a little way out of the end region 18 of the wiper arm 12 in the direction of longitudinal extent of the wiper arm 12 which is the same as the direction of longitudinal extent of the wiper blade 14 (cf. FIG. 6).

If the adaptor 16 is coupled to the combination plug 20 and correspondingly the channel pieces 22 and the electrical connections 34 are connected to the corresponding lines 24 or the electrical lines of the adaptor 16, two journals 58 formed on respective side walls 56 of the combination plug 20 are received in a recess of a latch element 60 which is arranged on outer sides of the rider 26.

The latch elements 60 of the rider 26, with their recess open in the installation direction of the adaptor 16 on the combination plug 20, are formed in this case as omega clips (cf. FIG. 3), wherein two arms 62 laterally limiting the recess engage behind the journal 58 in the position latched to the corresponding journal 58. As a result of the fact that the adaptor 16 is firmly connected to the combination plug 20 via the two omega clips, when the adaptor 16 is moved in the direction of longitudinal extent of the wiper arm 12, the combination plug 20 follows this movement of the adaptor 16. In addition, the combination plug 20 coupled to the adaptor 16 is movable together with the adaptor 16 about the rotational axle 36, wherein a movability of around +/−5° with respect to the horizontal can be provided for.

The combination plug 20, like the slider 38, has, on its upper side, a latching tongue 64 with a latching pin 66. If, after the adaptor 16 has been unlatched through pressing on the latching pin 50 of the adaptor 16, the latter and with it the wiper blade 14 are displaced forward into the installation position shown in FIG. 6, then the latching pin 66 of the combination plug 20 latches in the through-opening 52 provided in the back 54 of the wiper arm 12 in the end region 18 thereof.

As a result, the combination plug 20 is fixed in relation to the direction of longitudinal extent of the wiper arm 12 as soon as the latching pin 66 of the combination plug 20 passes through the latch opening 52. A front stop 68 formed on a lower side of the combination plug 20 also ensures that, on reaching the installation position in the end region 18 of the wiper arm 12, the combination plug 20 cannot move further onto the end of the wiper arm 12 that is open at the front. This is because the stop 68 runs onto a guide rail 70 (cf. FIG. 2) which protrudes inwardly from a limb 72 of the wiper arm 12 having a U-profile in the end region 18 (cf. FIG. 7).

Above the stop 68, the side wall 56 of the combination plug 20 forms a projection 74 protruding forwards in the direction of longitudinal extent of the wiper arm 12 (cf. FIG. 2). When the combination plug 20 is displaced in the direction of longitudinal extent of the wiper arm 12, a lower side of the projection 74 runs onto the guide rail 70 before the latching pin 66 has reached the through-opening 52 in the back 54 of the wiper arm 12 (cf. FIG. 7). The projection 74 is in this case tapered towards the lower side running onto the guide rail 70 to make it easier to guide the combination plug 20 on the guide rail 70.

The guide rails 70 arranged on the two limbs 72 of the wiper arm 12 in its end region 18 therefore ensure that the combination plug 20 brought into its installation position shown in FIG. 6 cannot move forwards or downwards out of the end region 18.

Figure 7:
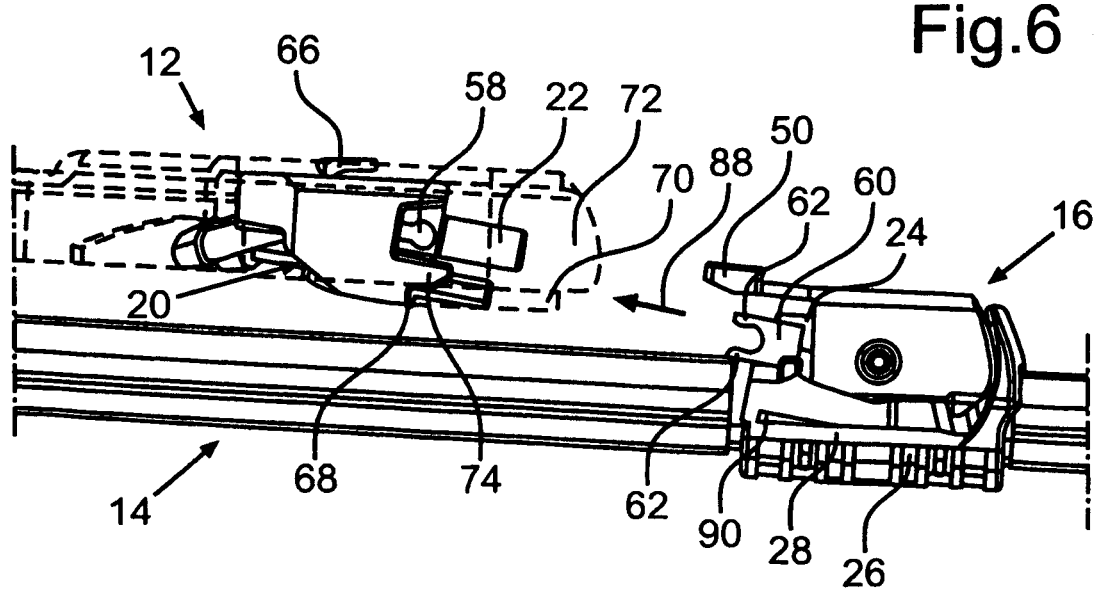
FIG. 7 illustrates a side view of the adaptor, which is holding the wiper blade, pulled out of the end region of the wiper arm in the direction of longitudinal extent thereof, and the wiper arm with the combination plug.

If the combination plug 20 is fixed in the installation position shown in FIG. 6 and FIG. 7, the adaptor 16 can be separated from the combination plug 20 by pulling on the wiper blade 14 or on the adaptor 16 in the direction of longitudinal extent of the wiper arm 12. The installation position of the combination plug 20 therefore likewise represents a removal position.

Figure 4:
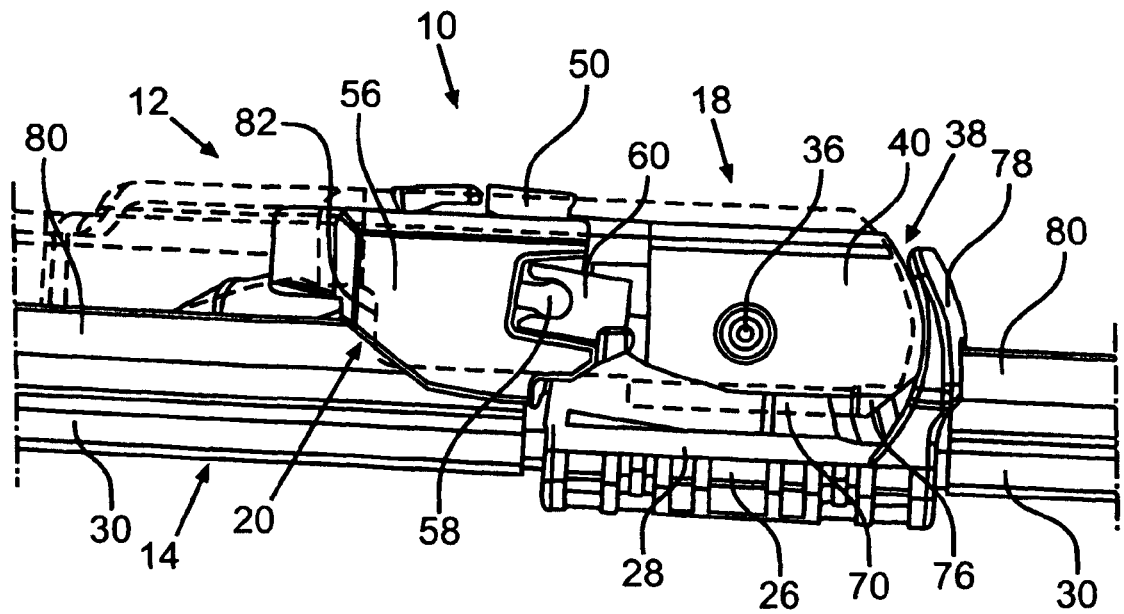
FIG. 4 illustrates a side view of a connecting arrangement which comprises the wiper arm and the wiper blade, wherein the adaptor is in its functional position.

As shown in FIG. 4, the lower sides of the side walls 40 of the rider 38 rest on the two guide rails 70 in the functional position of the adaptor 16. In addition to the latching pin 50 received in the latch opening 52 in this functional position of the adaptor 16, a stop 76 ensures that the adaptor 16 and with it the combination plug 20 can be pushed into the end region 18 of the wiper arm 12 no further than this functional position of the adaptor 16 if the wiper blade 14 is fitted on the wiper arm 12. This is because, if the adaptor has reached the functional position shown in FIG. 4, the stop 76 is in abutment with the guide rail 70.

FIG. 4 also shows that the rider 26 forms a front wall 78 through which the end region 18 of the wiper arm 12 that is open at the front is closed, at least in part, in a visually attractive way. An upwardly pointing web 80 of the spoiler 32 is received in a notch 79 made in the front wall 78 (cf. FIG. 1).

FIG. 4 shows that, in one of the two limbs 72 of the wiper arm 12, a recess 82 is made which receives the web 80 when the wiper blade 14 is pivoted about the rotational axle 36.

Figure 5:
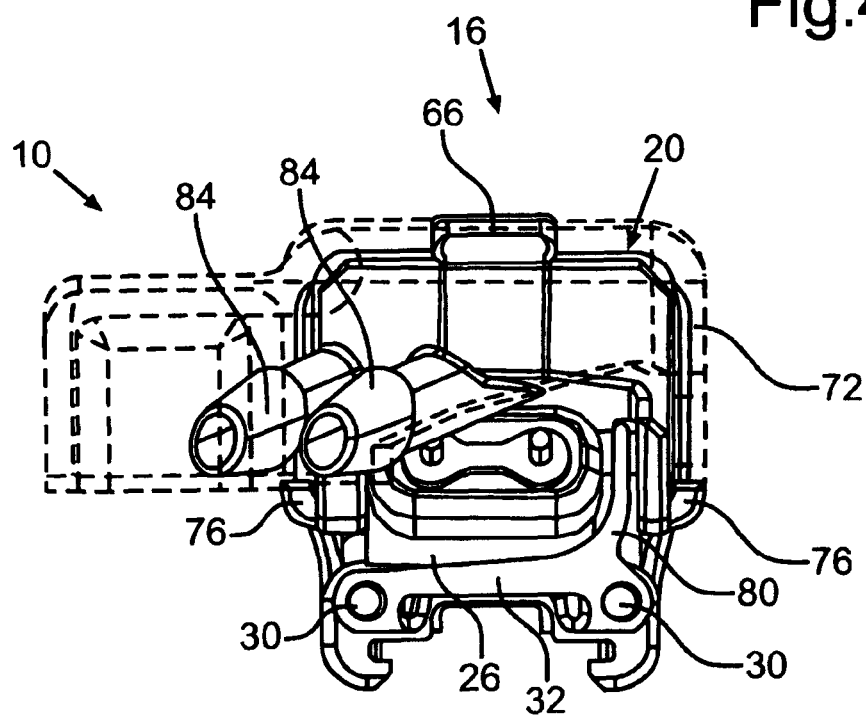
FIG. 5 illustrates the connecting arrangement according to FIG. 4 viewed in the direction of longitudinal extent of the wiper blade or of the wiper arm.

FIG. 5 shows particularly clearly the two channels 30 that run in the direction of longitudinal extent of the wiper blade 14 and of the wiper arm 12 and which are formed by the spoiler 32. It can also be seen in FIG. 5 that the combination plug 20 comprises two connection nozzles 84 coupled to hose lines (not shown) in order to be able to feed washer fluid to the wiper blade 14. The two connection nozzles 84 extend into a Z-shaped bend 86 that the wiper arm 12 has near its end region 18 (cf. FIG. 1).

If the combination plug 20 is displaced into the installation position or removal position shown in FIG. 6, that is to say is moved to the front end of the wiper arm 12 by pulling on the adaptor 16 in the direction of longitudinal extent of the wiper arm 12, then the hose lines laid in the bend 86 can also follow this path. Alternatively, the hose lines can be designed to be extendible, for example in the form of corrugated tubes. The electrical lines leading to the electrical connections 34 of the combination plug 20 and laid in the wiper arm 12 can be laid in the hose lines and therefore likewise easily follow the movement of the combination plug 20 forwards. Alternatively, the electrical lines can be laid with excess length in the wiper arm 12.

When the wiper blade 14 is removed from the wiper arm 12, the adaptor 16 is pulled forwards out of the end region 18 of the wiper arm 12 if the combination plug 20 is in the removal position shown in FIG. 6. In this removal position, the latching pin 66 of the combination plug 20 is latched in the latch opening 52 provided in the back 54 of the wiper arm 12 in its end region 18. In addition, in the removal position, the front wall 78 of the rider 26 belonging to the adaptor 16 is spaced apart from the front end of the wiper arm 12.

The combination plug 20 and the adaptor 16 are separated from one another by pulling further on the adaptor 16 in the direction of longitudinal extent of the wiper arm 12. If the latch elements 60 release the journals 58 provided on the combination plug 20, this unlatching sound can clearly be heard by the mechanic. When removing the wiper blade 14 from the wiper arm 12, the mechanic therefore first hears the latching of the latching pin 66 in the latch opening 52 and then the separation of the latch elements 60 and the journals 58.

If the adaptor 16 is inserted into the end region 18 of the wiper arm 12 in an installation direction coinciding with the direction of longitudinal extent of the wiper blade 14 and of the wiper arm 12, which is shown by an arrow 88 in FIG. 7, then insertion chamfers 90 provided on the rider 26 aid this process.

As soon as the adaptor 16 is then coupled to the combination plug 20 and the arms 62 of the latch elements 60 engage behind the two journals 58 arranged on the combination plug 20, the mechanic can tell, by the latching sound of the omega clips, that the adaptor 16 is connected to the combination plug 20. The pin 66 of the combination plug 20, which pin 66 is located in the latch opening 52, is then pushed downwards and the adaptor 16 is displaced further together with the combination plug 20 in the installation direction until the pin 50 provided on the rider 38 of the adaptor 16 latches in the latch opening 52.

This latching sound can also be heard by the mechanic, and the latching of the latching pin 50 in the latch opening 52 can also be seen. As soon as the adaptor 16 and with it the wiper blade 14 is in the functional position shown in FIG. 1, the adaptor 16 is securely held on the wiper arm 12 and washer fluid can be applied to the windscreen via the wiper blade 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wiper arm arrangement, comprising:
   a wiper blade;
   a wiper arm of a windscreen wiper system of a vehicle; and
   an attachment element having at least one line, wherein the attachment element is coupled to a connecting element configured to hold the wiper blade and connect the wiper blade to the wiper arm,
   wherein, due to the coupling, at least one corresponding line of the connecting element is joined onto the at least one line of the attachment element,
   wherein the connecting element is fitted onto the attachment element in an installation direction coinciding with a direction of longitudinal extent of the wiper arm,
   wherein the attachment element is arranged on the wiper arm so as to be movable in a forward direction toward a front open end of the wiper arm,
   wherein a side wall of the attachment element includes a stop and a projection that protrudes in the forward direction toward the front open end of the wiper arm and wherein when the attachment element moves in the forward direction toward the front open end of the wiper arm, a lower side of the projection runs onto a guide rail which protrudes from a bottom-most portion of a limb of the wiper arm at the front open end of the wiper arm and the stop runs onto the guide rail to ensure that the attachment element cannot move further toward the front open end of the wiper arm.

2. The wiper arm arrangement according to claim 1, wherein when coupled to the connecting element, the attachment element is moveable in the direction of longitudinal extent through movement of the connecting element.

3. The wiper arm arrangement according to claim 1, wherein an end region of the wiper arm has at least one latch opening arranged in a back of the wiper arm, in which latch opening a corresponding latch element of the connecting element is received in a functional position of the connecting element.

4. The wiper arm arrangement according to claim 3, further comprising:
   at least one latch element arranged on the attachment element, wherein the at least one latch element is engageable in the at least one latch opening arranged in the end region of the wiper arm by bringing the attachment element into an installation position.

5. The wiper arm arrangement according to claim 4, wherein when the attachment element is brought into the installation position, the attachment element is taken to the guide rail on the wiper arm before the at least one latch element of the attachment element engages in the corresponding latch opening arranged in the end region of the wiper arm.

6. The wiper arm arrangement according to claim 5, wherein when the attachment element is fixed on the wiper arm in the installation position, the connecting element is detachable from the attachment element by further movement of the connecting element in the forward direction toward the front open end of the wiper arm.

7. The wiper arm arrangement according to claim 1, wherein the at least one line of the attachment element is configured to carry washer fluid or heat into the connecting element.

8. The wiper arm arrangement according to claim 1, wherein the wiper arm arrangement comprises the connecting element having at least one latch element comprising a recess open in the installation direction, in which a journal arranged on the attachment element is received in a latched manner when coupled with the attachment element.

9. The wiper arm arrangement according to claim 1, wherein the wiper arm arrangement has the connecting element comprising an upper part arranged on the wiper arm, on which upper part a lower part of the connecting element configured to hold the wiper blade and having insertion element is supported such that it can rotate about a rotational axle.

* * * * *